US008919280B1

(12) United States Patent
Haff et al.

(10) Patent No.: US 8,919,280 B1

(45) Date of Patent: Dec. 30, 2014

(54) X-RAY IRRADIATION SYSTEM FOR STERILIZATION OF INSECTS

(75) Inventors: Ronald P. Haff, Davis, CA (US); Eric S. Jackson, Lafayette, CA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 209 days.

(21) Appl. No.: 13/242,776

(22) Filed: Sep. 23, 2011

Related U.S. Application Data

(60) Provisional application No. 61/387,935, filed on Sep. 29, 2010.

(51) Int. Cl.
*A01K 29/00* (2006.01)

(52) U.S. Cl.
USPC ........................................... 119/6.5; 119/174

(58) Field of Classification Search
USPC .......... 119/6.5, 174, 650, 651; 43/132.1, 124; 378/64, 68, 69; 422/22; 250/455.11, 250/492.1
See application file for complete search history.

(56) References Cited

U.S. PATENT DOCUMENTS 4,368,690 A * 1/1983 Tenzer ........................... 119/6.6
4,484,341 A * 11/1984 Luniewski ...................... 378/69
5,446,289 A * 8/1995 Shodeen et al. ......... 250/455.11
6,868,136 B2 * 3/2005 Hansen et al. .................. 378/69
7,133,493 B2 * 11/2006 Avnery ........................... 378/64
7,346,147 B2 3/2008 Kirk et al.
8,408,164 B2 * 4/2013 Robinson, Jr. ................ 119/843

OTHER PUBLICATIONS

Mastrangelo, T. et al., "A New Generation of X Ray Irradiators for Insect Sterilization" (2010) Journal of Economic Entomology, 103(1):85-94.

Rad Source Technologies Inc., RS 2400 Brochure p. 1.

Wagner, J. K., "Dose Characterization of the Rad Source 2400 X-Ray Irradiator", (2008) Academic Thesis, Office of Graduate Studies of Texas A&M University p. 1-63.

* cited by examiner

*Primary Examiner* — Rob Swiatek
*Assistant Examiner* — Lisa Tsang
(74) *Attorney, Agent, or Firm* — John D. Fado; Howard V. Owens, Jr.

(57) ABSTRACT

An apparatus and method for sterile insect technique comprising a plurality of x-ray sources surrounding a container containing insects targeted for reproductive sterilization, wherein the container is at an optimized distance from the x-ray sources, moves at a fixed rate along a direction perpendicular to a plane intersecting the x-ray sources, and rotates about an axis parallel to the longitudinal axes of said x-ray sources.

7 Claims, 5 Drawing Sheets

X-RAY IRRADIATION SYSTEM FOR STERILIZATION OF INSECTS

RELATED APPLICATIONS

This application is claims priority to U.S. Provisional Patent Application Ser. No. 61/387,935, filed Sep. 29, 2010 the contents of which are incorporated herein by reference in their entirety.

BACKGROUND OF THE INVENTION

Irradiation is a common method used for sterilizing objects in the food, medical, and entomology fields. Food irradiation reduces bacterial load, preventing foodborne illness. Irradiation of insects for use in Sterile Insect Technique (SIT) for suppression of native populations or invasive species is widespread. Irradiation is also used for a number of medical procedures. Insects are sterilized through irradiation and released into the wild to sexually compete with the population at large, thus reducing the chance for reproduction. Traditionally, irradiation sources are comprised of radioisotopes such as Cobalt. However, the use of radioisotopes is unpopular with the general population and access has become increasingly limited due to security issues. Consequently, efforts have been made to develop x-ray technology to replace radioisotopes for this purpose. Due to the heavy radiation dose required, these x-ray units are often comprised of high energy (450 kV) x-ray sources mounted in large cabinets. Whether irradiation is done with isotopes or x-ray sources, non-uniformity of the delivered dose has been a consistent problem. This, combined with the high cost of traditional irradiation equipment (in either form) has hindered the widespread use of SIT. Reported here is an irradiation technique using x-ray technology that uses multiple x-ray sources in a configuration that delivers a more uniform dose while providing equal throughput to the high power units at a significantly lower cost.

SUMMARY OF THE INVENTION

An embodiment of the invention is an apparatus utilizing x-ray tubes surrounding a cylinder containing insects targeted for sterilization wherein the cylinder is at an optimized distance and moves at a fixed rate along the direction perpendicular to the plane containing the four x-ray sources.

A further embodiment of the invention is a method of sterilizing insects with said apparatus.

a. DEFINITIONS

"SIT" means sterile insect technique wherein affected insects are infertile.

"Cylinder" means a solid of circular cross section in which the centers of the circles all lie on a single line, wherein the cross sections lie directly on top of each other. The term is inclusive of right circular cylinders.

"Plurality" means two or more x ray sources utilized for the sterilization technique.

X-ray absorption coefficient refers to a measure of the ability of a material to absorb x-rays.

"Insects" means all members of the Orders Lepidoptera and Diptera.

DETAILED DESCRIPTION OF THE INVENTION

An irradiation system using soft x-rays was developed for sterilization of insects for SIT. Using multiple x-ray tubes and minimizing source to insect distance allowed for the use of much lower x-ray energies than equipment that is currently available. In addition, the multiple tube design allows for a more uniform dose distribution within the container than has been accomplished using single point sources. The reduced x-ray energy requirement allows for the use of relatively inexpensive commercially available x-ray sources, making the system more economical than traditional methods. By surrounding a sample with a number n of x-ray sources: Sources currently in use in SIT include radioisotopes, high-energy electrons, and x-rays. Traditionally, SIT programs use gamma radiation sources, such as Cobalt60 and Cesium137, for development of isotopic irradiators to sterilize insects. These irradiators completely contain the radioisotopes and direct gamma rays toward a sample through a guided opening. Other alternatives to isotopic irradiators include high-energy electrons (with energy <10 MeV) and X rays (from electron beams with energies below 7.5 MeV), both of which require high voltage power sources. Reference: T. Mastrangelo, A. G. Parker, A. Jessup, R. Pereira, D. Orozco-Davila, A. Islam, T. Dammalage, and J. M. M. Walder. A New Generation of X Ray Irradiators for Insect Sterilization. Journal of Economic Entomology 103(1):85-94. 2010.

By surrounding a sample with a plurality of x-ray sources a higher applied dose may be achieved over single source x ray sources. A single source x ray system will have an upper limit of power and corresponding dose able to be applied and a limited amount of space to fit samples to rotate around it, whereas multiple x-ray sources around a sample theoretically provide many times the power and corresponding dose to a sample area. Additionally the plural x ray source described herein achieves a relatively uniform dose (see FIG. 4) of theoretical dose from four x-ray tubes) without the aid of moving parts. A minimum of two x-ray sources may be employed; however, four or more is preferred. This is beneficial when used in applications such as sterile insect technique (SIT) in which insect scales and parts eventually cover surfaces of the sample chamber and could possibly interfere with moving parts.

Figure 5:
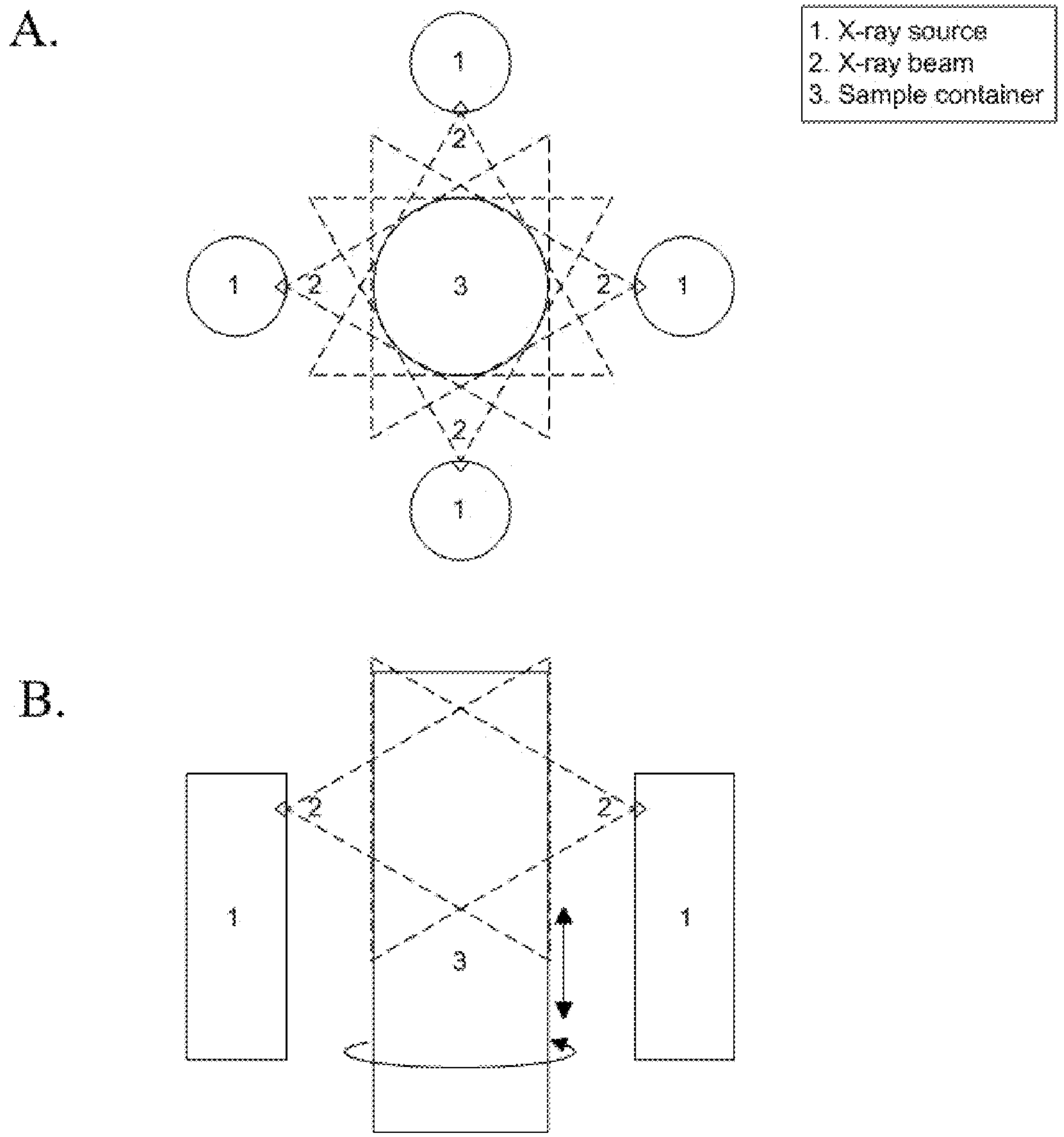
FIG. 5 is a drawing of four x-ray tubes with overlapping target areas or beams. The sample container moves vertically through an X-ray irradiation zone to receive a uniform dose. Rotation of the sample container could be incorporated to provide even more uniformity.

Insects are placed in a container similar to conventional methods using a material with limited x-ray absorbance as to pass as much dose as possible to the sample. Some examples herein incorporated by reference are: canisters of various materials (corrugated plastic tubing, cardboard, and aluminum), 20.3 cm long, various diameters (7.62 cm, 10.2 cm). Reference: Jennifer Koop Wagner, Jeff A. Dillon, Eugene K. Blythec, John R. Forda. Dose characterization of the rad Source™ 2400×-ray irradiator for oyster pasteurization, *Applied Radiation and Isotopes*, Volume 67, Issue 2, February 2009, Pages 334-339; plastic tubes (90 mm in height by 25 mm in diameter). Reference: T. Mastrangelo, A. G. Parker, A. Jessup, R. Pereira, D. Orozco-Dávila, A. Islam, T. Dammalage, and J. M. M. Walder. A New Generation of X Ray Irradiators for Insect Sterilization. *Journal of Economic Entomology* 103(1):85-94. 2010. The container may be of any desired geometric shape and volume, such as sphere, prism, cube or cylinder; however, a cylindrical container is preferred. Referring to FIG. 5, X-ray tubes (1) surround the cylinder (3) at an optimized distance so that the fan shaped beams (2) coming from the source cover the diameter of the circle. This results in a much more uniform dose through any cross section of the cylinder compared to the case of a single source. To allow for large samples and/or to increase throughput, the cylinder can move at a fixed rate along the direction perpendicular to the plane containing two or more x-ray sources, preferably four or more, providing the capability to sterilize insects with comparable throughput rates to the high power commercially available systems, with a more uniform applied dose and significantly reduced cost. The advantages associated with the technique include multiple irradiation sources for higher dose uniformity, multiple irradiation sources for rapid dose administration, strategically placed irradiation source(s) for real time irradiation and streamlining SIT systems by elimination of a separate sterilization step, by irradiation of insects in transit from hatching to collection in the breeding facility.

Sterile insect technique requires a particular dose to be achieved in order to sterilize an insect while also not applying too much dose so that it still appears to function normally in the wild. A typical, perhaps on the high end, dose used to sterilize moths is 350 Gy. Table 1 shows the typical dose from a 110 kV x-ray tube (Source is Faxitron users manual). A moth directly on the anode would receive 350 Gy in 41 seconds (1 Gy=100 R). Dose rises as $kV^{5/2}$, so with a 400 kV x-ray tube it would take around 2.5 sec to reach 350 Gy.

TABLE 1

Typical dose output of a 110 kV x-ray tube.

| Voltage (kV) | Distance from anode (cm) | R/min (Gy/min) |
|---|---|---|
| 110 | 0 | 51000 (510) |
| 110 | 30.48 | 300 (3.00) |
| 110 | 63.5 | 70 (0.70) |

Figure 1:
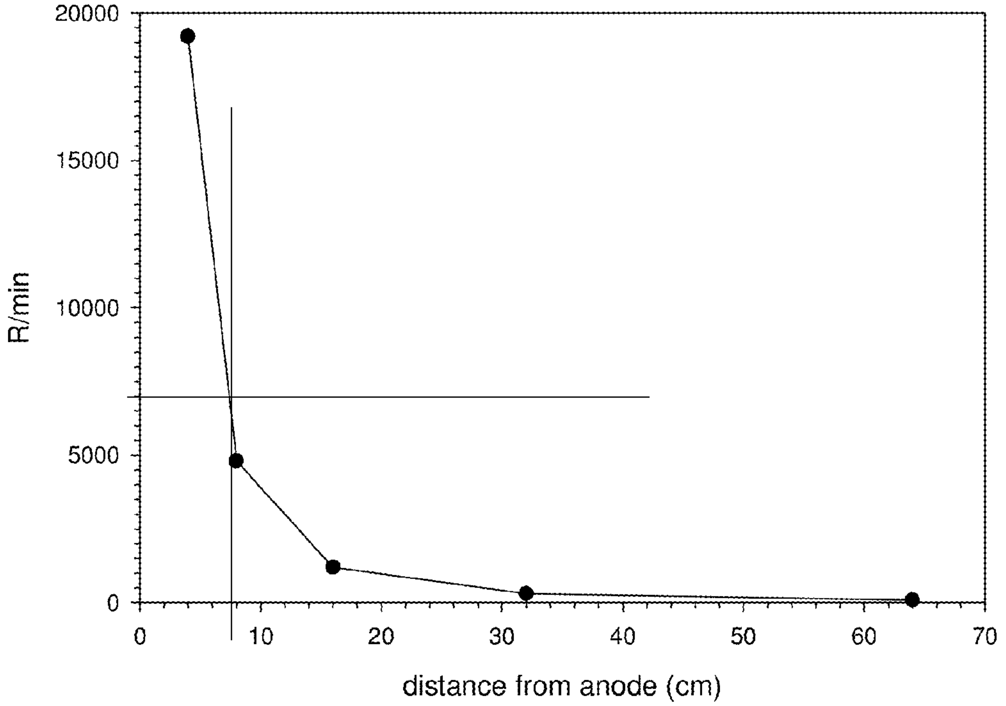
FIG. 1 shows a graph of the estimated dose as a function of distance from the anode of a 110 kV x-ray tube.

Dose declines as a function of the square of the distance from the source ($1/x^2$), therefore the data from Table 1 can be used to generate the graph of FIG. 1. At around 8 cm, the dose is about 7000 R/min (70 Gy/min). If four x-ray tubes were used simultaneously the collective dose would be increased to 280 Gy/min and 350 Gy could be achieved within 1.25 min. This compares to typical dose rates of 0.02 to 50 Gy/min (17500 to 7 min for 350 Gy) of existing commercial irradiators. The actual distance used would be optimized to maximize insect throughput by taking into account the dose rate of the x-ray tubes, the target angle of the x-ray tubes, and the density of the insects to be sterilized.

Figure 2:
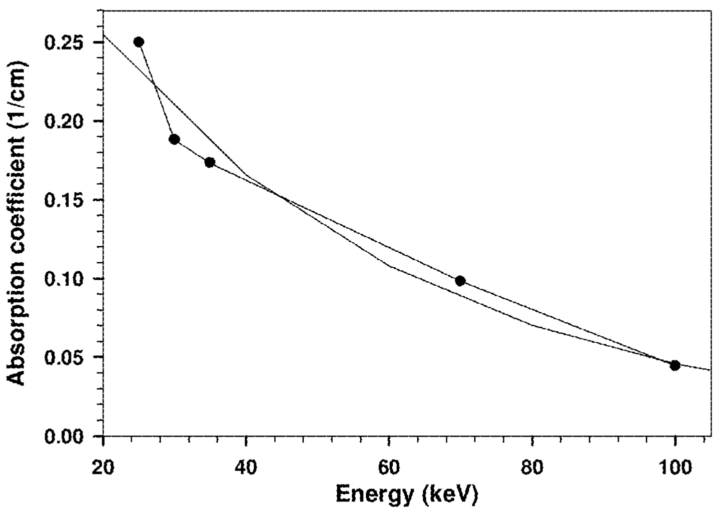
FIG. 2 shows a plot of the absorption coefficient derived for the Light Brown Apple Moth (LBAM).
Figure 3:
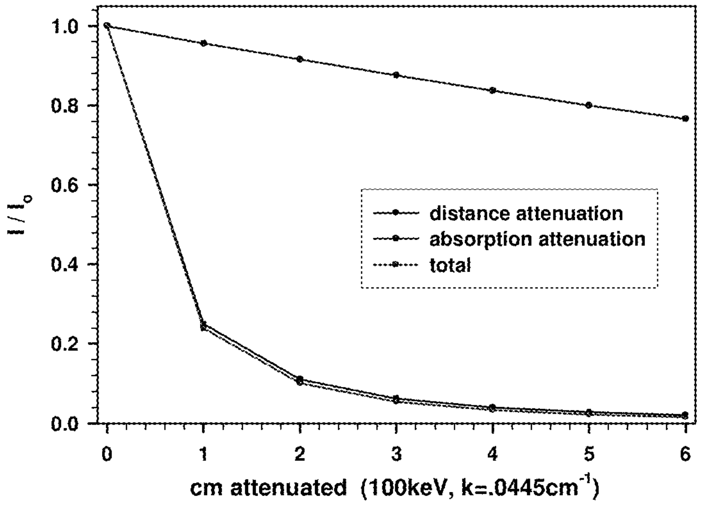
FIG. 3 shows a dose attenuation due to distance from the anode, LBAM absorption and total combined effect.

While time to achieve the required dose is a major advantage of using multiple x-ray tubes, the uniform dose distribution is also far superior to single point sources. The distribution is a consequence of distance from the anodes and attenuation by the moths. FIG. 2 shows the absorption coefficient derived for the Light Brown Apple Moth (LBAM). FIG. 3 compares attenuation from the moth with loss in intensity due to distance from the anode, with distance being the dominant factor over effects from LBAM density.

Figure 4:
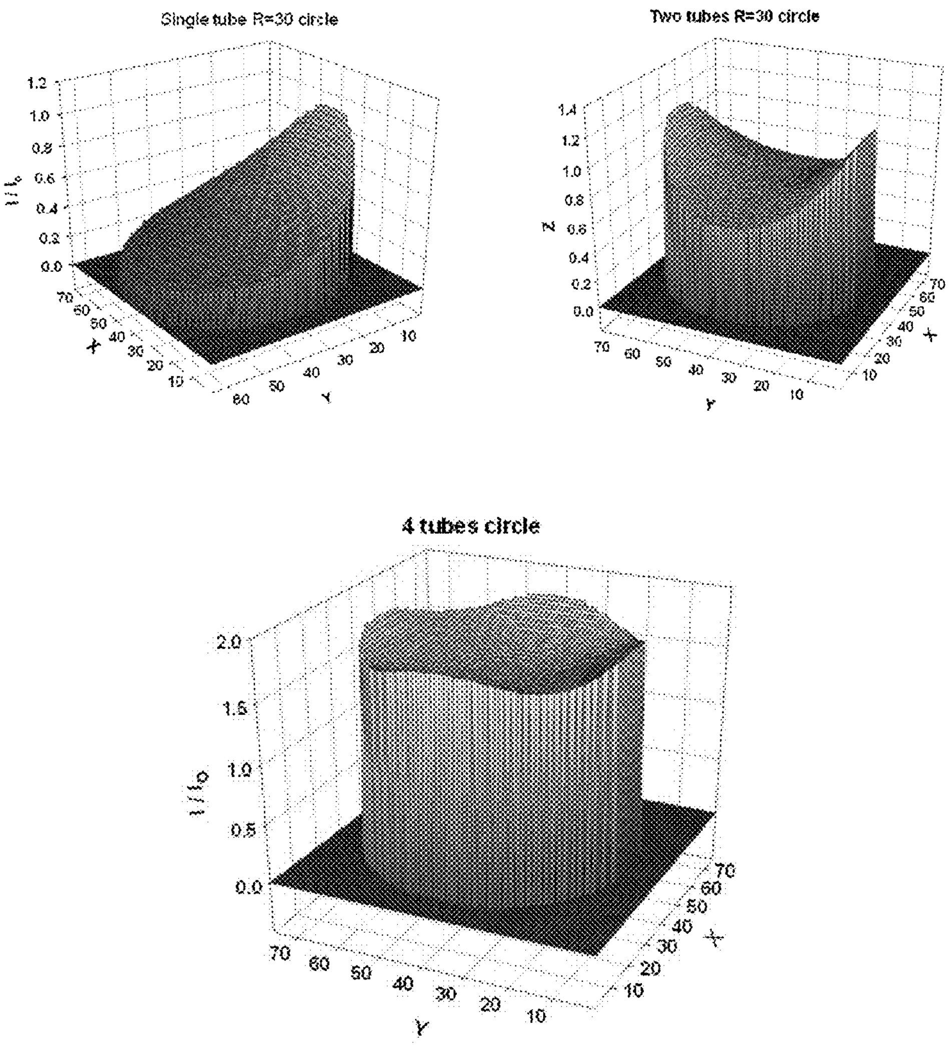
FIG. 4 illustrates calculated dose distributions based on distance attenuation through a horizontal slice of a cylinder for one, two, and four x-ray tubes.

FIG. 4 shows the calculated dose distributions (based on distance attenuation) through a horizontal slice of a cylinder for one, two, and four x-ray tubes. Non-uniformity of single point irradiation sources is a consequence of the fact that the delivered dose declines as a function of the square of the distance from the source. By arranging sources concentrically around the sample, the uniformity of the dose obviously increases as the number of tubes increases. An embodiment of the irradiation system employs a sample container that would move vertically at a constant rate through the uniformly irradiated zone so that each circular cross section receives the same dose. A further embodiment is an increase in the uniformity of the dose by rotating the sample container while moving vertical through the irradiation zone.

Multiple tubes with uniform dose distribution and rapid dose rate also introduce the concept of real-time irradiation to SIT. This streamlines SIT facilities by removing the separate process of sterilization from hatching/collection. Instead, insects could be sterilized at some point during the breeding stages, such as when they are transported from the hatching area to the collection area. Multiple sources could easily be placed around the tube in which the insects are being transported. Sources or even a single high power source could be strategically placed so that insects are exposed to irradiation for the appropriate amount of time to achieve a required dose. Target angles of sources could be varied as needed, with large target angles allowing for a longer stretch of transport area to be irradiated. One issue with real-time irradiation could be power consumption if the system was on full time. This could be remedied by a trigger when moths are detected or some other similar adjustment to use power only when needed.

Methods and Materials

The irradiation system consisted of four 100 kV, 1000 W x-ray tubes (CXR-105, Comet North America, Stamford, Conn.) arranged concentrically around a sample area to be irradiated. The x-ray tubes were positioned at a distance to maximize insect throughput while minimizing the time to achieve the required dose. Based on the estimated dose rate of the x-ray tubes, the target angle of the x-ray tubes, and the density of the moths, the optimum distance from the source to the center of the sample was approximately 11.0 cm. This distance was optimum for a sample area and corresponding container of about 8 cm diameter and 8 cm height. For large sample volumes a cylindrical sample container would maintain the optimum diameter for a uniform dose rate and maximum throughput, but could vary in height. To compensate for the decrease in dose along its axis, the cylinder would move at a fixed rate along the direction perpendicular to the plane containing the four x-ray sources. This vertical movement could be done with an electric, hydraulic, or other type of actuator; conveyor; pulley; or any other system to move a sample container through an irradiated area. For an even more uniform dose, the sample container could rotate while moving vertically through the irradiation zone. Rotation could be achieved by mounting this movement system onto a rotating motor, rotating an actuator system via threaded parts, or other means of rotating objects.

The x-ray tubes and sample area were housed in a shielded cabinet lined with lead at least 0.125 inches thick on all sides, top, bottom, and door face. The cabinet included a door face with a step down notch design seated inside the frame, and a shielded port hole for power cables and cooling hoses. X-ray tubes were powered with 100 kV, 1000 W high voltage power supplies (XPg-100N10, Matsusada Precision Inc., San Jose, Calif.). Each x-ray tube had a corresponding power supply, though an ideal system would need only one power supply for all x-ray tubes. Power supplies were interlocked using magnetic switches on the door and body of the cabinet, to automatically cut power if the door was opened. X-ray tubes were water-cooled using a chiller (M1-1.5 A, Advantage Engineering, Greenwood, Ind.). A single hose led to and from the chiller, with a manifold system inside the cabinet to provide coolant to the individual x-ray tubes.

We claim:

1. An apparatus for sterile insect technique comprising a plurality of x-ray sources surrounding a container containing insects targeted for reproductive sterilization, wherein the container is at an optimized distance from the x-ray sources, moves at a fixed rate along a direction perpendicular to a plane intersecting the x-ray sources, and rotates about an axis parallel to the longitudinal axes of said x-ray sources.

2. The apparatus of claim 1, wherein the container is cylindrical.

3. The apparatus of claim 1, wherein the container is spherical.

4. The apparatus of claim 1, wherein the container is selected from the group consisting of cylindrical and spherical shapes.

5. The apparatus of claim 4, wherein four x-ray sources are utilized.

6. A method for sterile insect technique comprising placing insects in a container wherein the container is surrounded by a plurality of x-ray sources and positioned at an optimized distance from the x-ray sources, moving the container at a fixed rate along a direction perpendicular to a plane intersecting the x-ray sources, and concurrently rotating the container on an axis longitudinal to said x-ray sources for a time sufficient to promote reproductive sterilization.

7. The method of claim 6, wherein the insects are selected from the group consisting of *Drosophila* and *Epiphyas*.

* * * * *